(12) United States Patent
Kurian

(10) Patent No.: US 10,210,485 B2
(45) Date of Patent: Feb. 19, 2019

(54) SYSTEM FOR IDENTIFYING RESOURCE ISSUES AND MANAGING A NETWORK OF RESOURCES

(71) Applicant: Bank of America Corporation, Charlotte, NC (US)

(72) Inventor: Manu Jacob Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 260 days.

(21) Appl. No.: 15/185,995

(22) Filed: Jun. 17, 2016

(65) Prior Publication Data

US 2017/0364871 A1    Dec. 21, 2017

(51) Int. Cl.
| | |
|---|---|
| G06Q 10/00 | (2012.01) |
| H04L 12/26 | (2006.01) |
| H04L 12/24 | (2006.01) |
| H04L 29/08 | (2006.01) |
| G06Q 20/10 | (2012.01) |
| H04L 29/06 | (2006.01) |

(52) U.S. Cl.
CPC ......... *G06Q 10/20* (2013.01); *G06Q 20/1085* (2013.01); *H04L 41/0677* (2013.01); *H04L 41/0686* (2013.01); *H04L 43/50* (2013.01); *H04L 63/08* (2013.01); *H04L 63/105* (2013.01); *H04L 67/02* (2013.01); *H04L 67/18* (2013.01); *H04L 41/22* (2013.01)

(58) Field of Classification Search
CPC .............................. G06Q 10/20; G06Q 20/1085
See application file for complete search history.

(56) References Cited

U.S. PATENT DOCUMENTS

| | | | |
|---|---|---|---|
| 5,694,323 A | 12/1997 | Koropitzer et al. | |
| 6,109,522 A | 8/2000 | Force et al. | |
| 6,264,101 B1 | 7/2001 | Ryan et al. | |
| 7,036,048 B1 | 4/2006 | Gill et al. | |
| 7,340,415 B1 | 3/2008 | Gasper et al. | |
| 7,401,264 B1* | 7/2008 | Gill | G06Q 20/1085 235/379 |
| 2003/0009426 A1* | 1/2003 | Ruiz-Sanchez | G06Q 20/04 705/78 |
| 2004/0215566 A1 | 10/2004 | Meurer | |
| 2004/0217162 A1 | 11/2004 | Chigira et al. | |
| 2008/0121692 A1* | 5/2008 | MacPhail | G06Q 20/00 235/379 |
| 2009/0005905 A1 | 1/2009 | Kuehnrich et al. | |
| 2011/0191243 A1 | 8/2011 | Allen | |
| 2015/0154600 A1* | 6/2015 | Diehl | G06Q 20/4016 705/39 |
| 2017/0352015 A1* | 12/2017 | Xu | G06Q 20/1085 |

\* cited by examiner

*Primary Examiner* — Robert R Niquette
(74) *Attorney, Agent, or Firm* — Michael A. Springs; Moore & Van Allen PLLC; James C. Edwards

(57) ABSTRACT

Systems, computer program products, and methods are described herein for resource manager entity device security and maintenance. The present invention is configured to identify an issue with a resource and notify all other resources across the entity and customers of the entity that the resource is experiencing an issue; determine that an account is involved in a counterfeit activity and notify all other resources across the entity to deny further activity associated with the account; determine that the first resource is experiencing an issue and send fixes to the first resource and all other resources located within a predetermined distance from the first resource.

20 Claims, 10 Drawing Sheets

SYSTEM FOR IDENTIFYING RESOURCE ISSUES AND MANAGING A NETWORK OF RESOURCES

BACKGROUND

Entity resources often experience issues causing inconvenience to the customers of an entity. There is a need for a system to notify about the issue at a resource, to the customers and other resources of the entity linked with the resource having an issue.

SUMMARY

The following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

In general terms, embodiments of the present invention address the above needs and/or achieve other advantages by providing apparatuses (e.g., a system, computer program product and/or other devices) and methods for resource manager entity device security and maintenance.

Embodiments of the invention are directed to an apparatus comprising a web-based communication interface, a memory device storing an application and a processing device operatively coupled to the memory device wherein the processing device is configured to execute computer-readable program code to run performance and maintenance tests periodically for detecting any issues with a resource; identify an issue with a first resource; transmit a notification associated with the identified issue to the entity based on an alert triggered by a performance and maintenance test results; notify, via the web-based communication interface to all other device across an entity based on identifying that there is the issue at the first resource; dispatch an alert to all other devices associated with the entity within a predetermined distance from the first resource of an increase in the number of transactions; identify that a customer has initiated an online banking session via a web browser or a mobile application; and notify, via a graphical user interface, that the first resource is experiencing the issue and provide locations of all other devices located within the predetermined distance.

In some embodiments, the entity runs performance and maintenance tests periodically for detecting any issues.

In some embodiments, the resource runs performance and maintenance tests periodically for detecting any issues.

In some embodiments, the resource transmits the notification to the entity based on the alert triggered by the performance and maintenance test results.

In some embodiments, the processing device is further configured to execute computer-readable program code to identify an account at the entity, linked with counterfeit activity; and communicate a message to all other devices across the entity to deny further activity associated with the account at the resource.

In another aspect, an apparatus resource manager entity device security and maintenance comprising a network communication interface, a memory device storing a resource manager entity device security and maintenance application, and a processing device operatively coupled to the memory device, wherein the processing device is configured to execute computer-readable program code to identify an issue with a first ATM; notify, via the network communication interface to all other devices across a financial institution, based on identifying that there is the issue at the first ATM; transmit an alert to all other devices associated with the financial institution within a predetermined geographic distance from the first ATM of an increase in the number of transactions; identify that a customer has initiated an online banking session via a web browser or a mobile application and identify a location of the customer; and notify, via a graphical user interface, that the first ATM is experiencing the issue and provide locations of all other devices located within the predetermined geographic distance of the location of the customer.

In some embodiments, the processing device is further configured to execute computer-readable program code to receive authentication credentials from a mobile device corresponding to one of the plurality of customers; validate the authentication credentials, thereby verifying an identity of the customer; and in response to validating the identity of the customer, notify the customer that the first ATM is experiencing the issue.

In some embodiments, the customers are notified of the issue only after validating the customer.

In some embodiments, a location of the customer is identified based on identifying the location of the initiation of the online banking session.

In some embodiments, the customer is notified of the issue based on determining that the first ATM is in the proximity of the location of the customer.

In some embodiments, the customer's preferred ATM is identified.

In some embodiments, the customer's preferred ATM is checked for having an issue and notifying the customer about the issue.

In some embodiments, the processing device is further configured to execute computer-readable program code to determine a security issue at the first ATM; and send fixes related to the security issue, to the first ATM and all other devices located within the predetermined geographic distance.

In some embodiments, the processing device is further configured to execute computer-readable program code to identify a debit and/or credit card associated with an account at the financial institution, linked with counterfeit transactions; and communicate a message to all other devices across the financial institution to deny further transactions associated with the debit and/or credit card.

In another aspect, a computer program product for resource manager entity device security and maintenance, the computer program product comprising at least one non-transitory computer-readable medium having computer-readable program code portions embodied therein, the computer-readable program code portions comprising an executable portion configured for identifying an issue with a first ATM; an executable portion configured for notifying, via the network communication interface to all other devices across a financial institution, based on identifying that there is the issue at the first ATM; an executable portion configured for transmitting an alert to all other devices associated with the financial institution within a predetermined geographic distance from the first ATM of an increase in the number of transactions; an executable portion configured for identifying that a customer has initiated an online banking session via a web browser or a mobile application and identifying a location of the customer; and an executable portion configured for notifying, via a graphical user interface, that the first ATM is experiencing the issue and provide locations of all other devices located within the predetermined geographic distance of the location of the customer.

In yet another aspect, a computer-implemented method for resource manager entity device security and maintenance, the method comprising identifying an issue with a first ATM; notifying, via the network communication interface to all other devices across a financial institution, based on identifying that there is the issue at the first ATM; transmitting an alert to all other devices associated with the financial institution within a predetermined geographic distance from the first ATM of an increase in the number of transactions; identifying that a customer has initiated an online banking session via a web browser or a mobile application and identifying a location of the customer; and notifying, via a graphical user interface, that the first ATM is experiencing the issue and provide locations of all other devices located within the predetermined geographic distance of the location of the customer.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
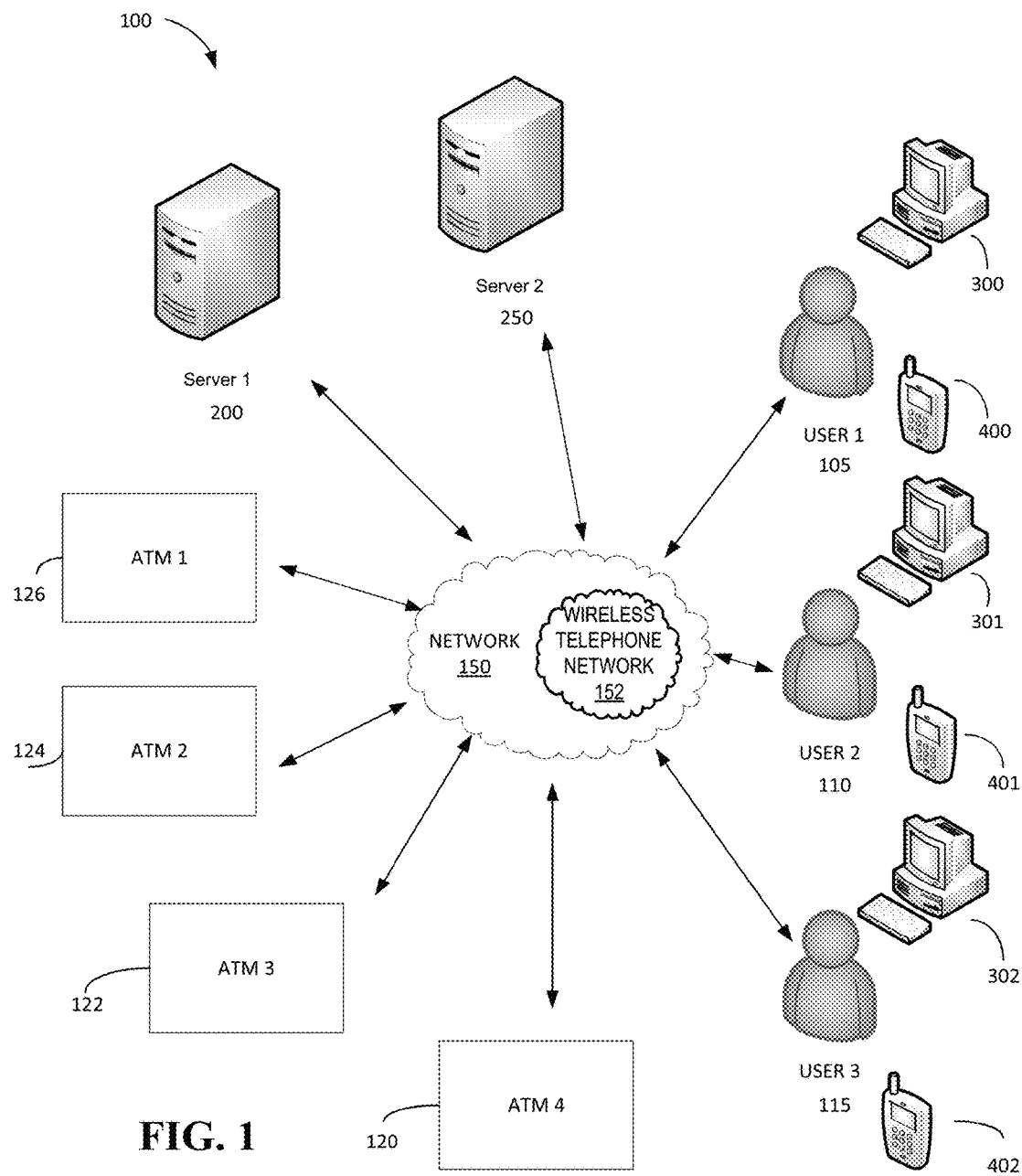
Figure 2:
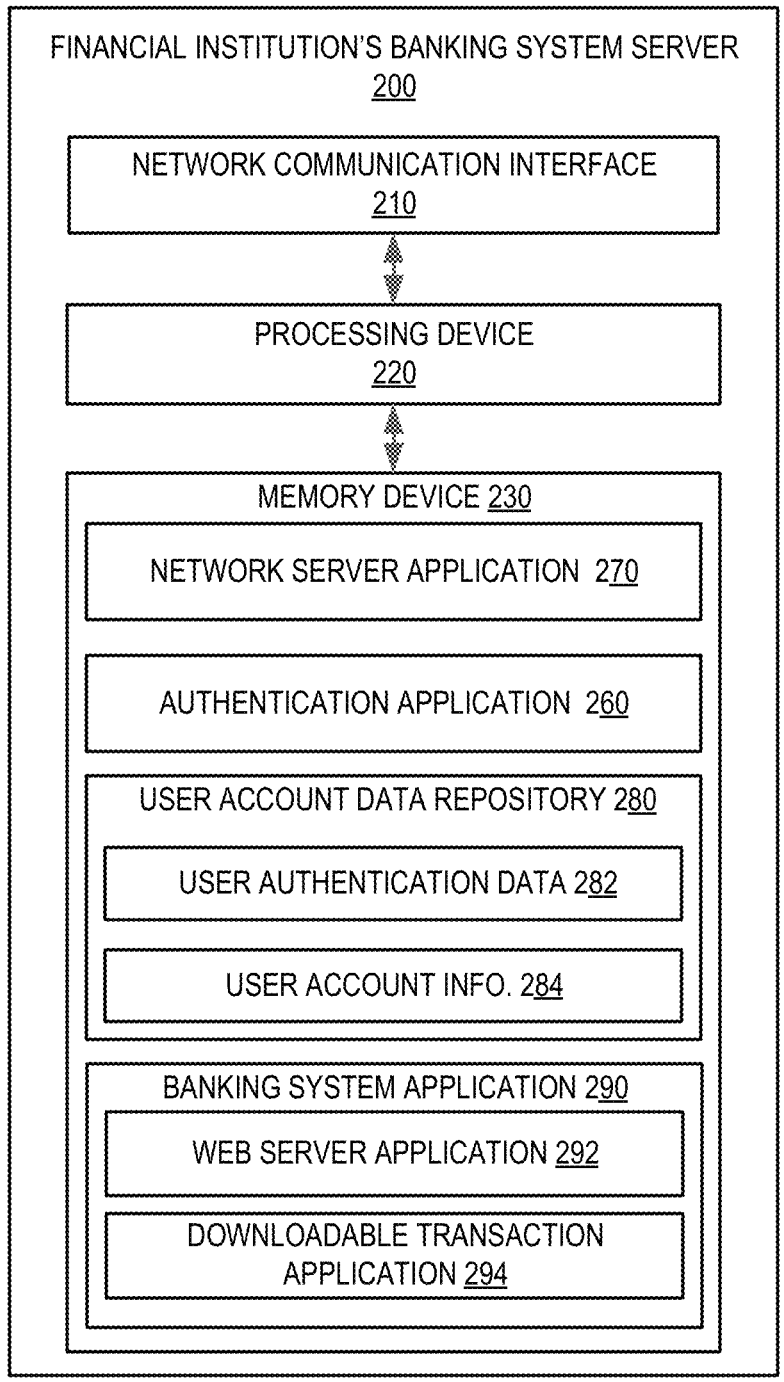
Figure 3:
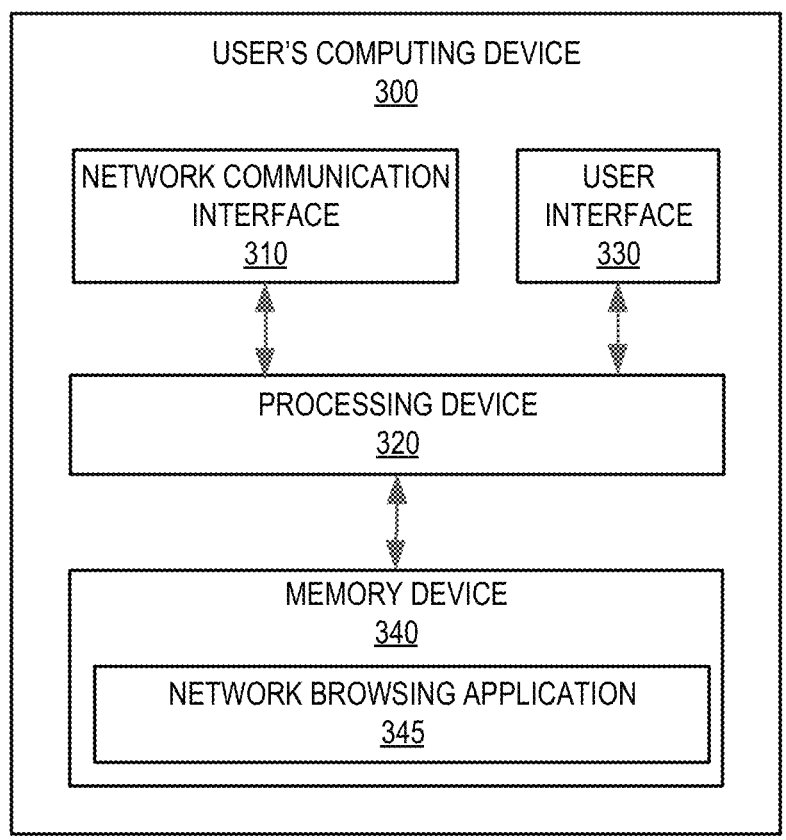
Figure 4:
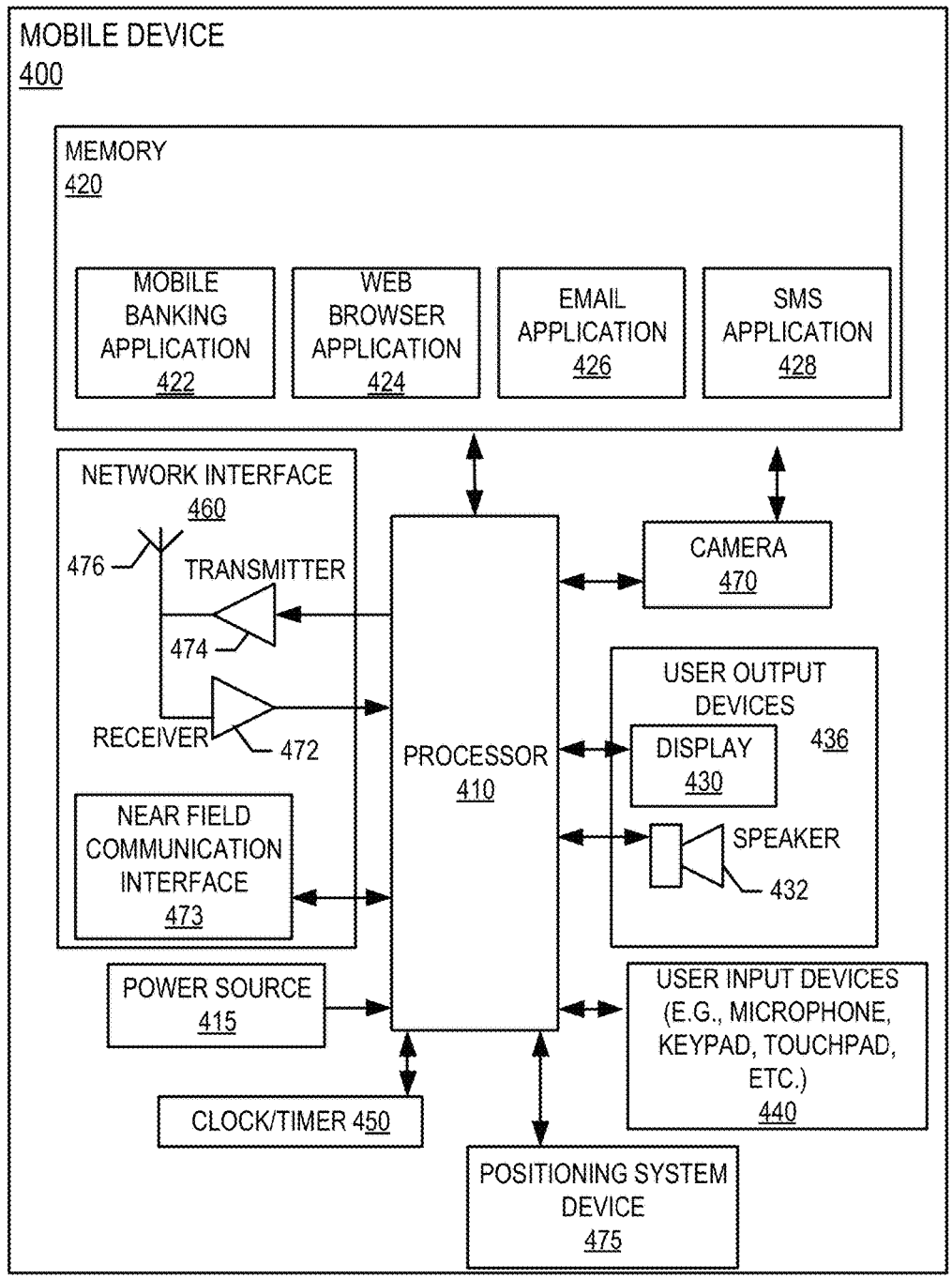
Figure 5:
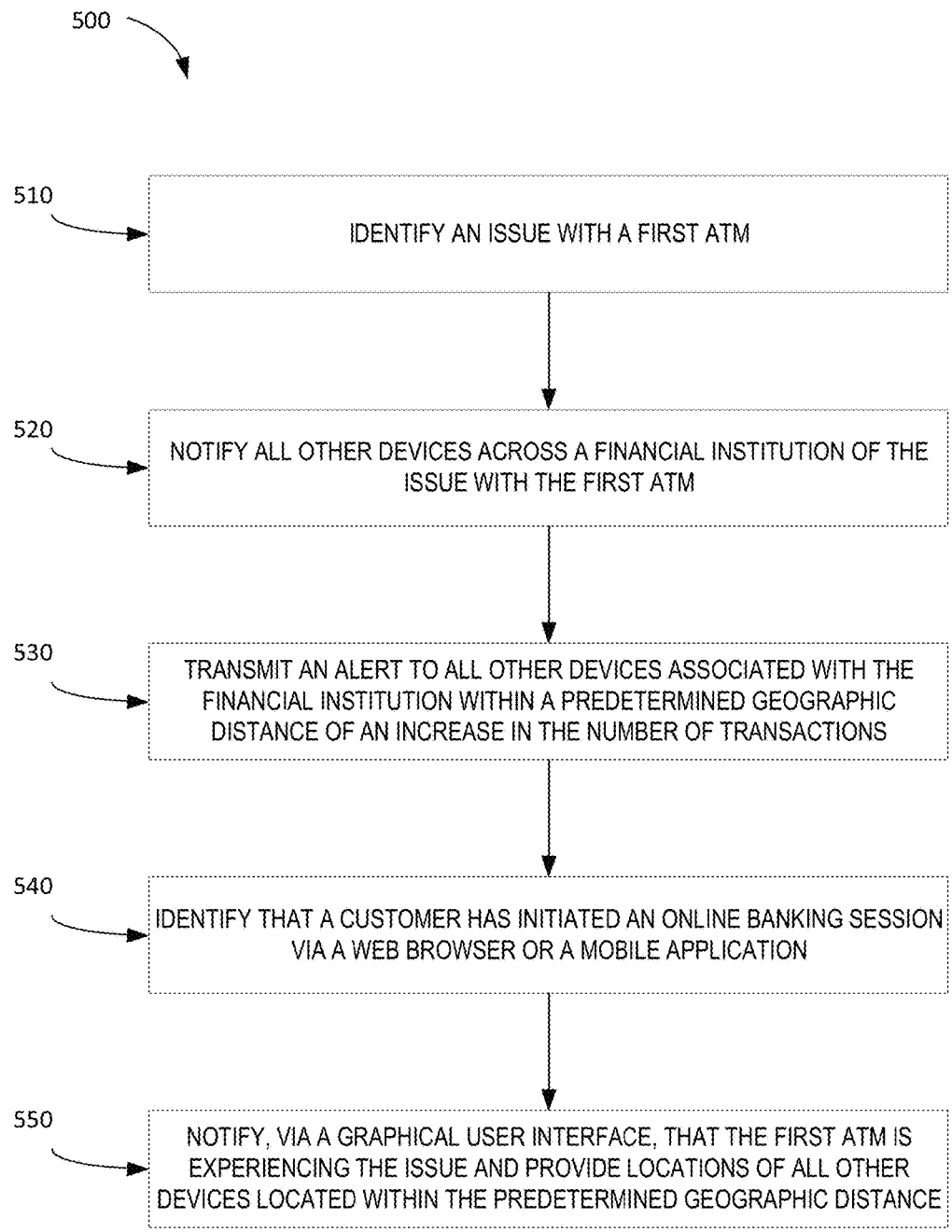
Figure 6:
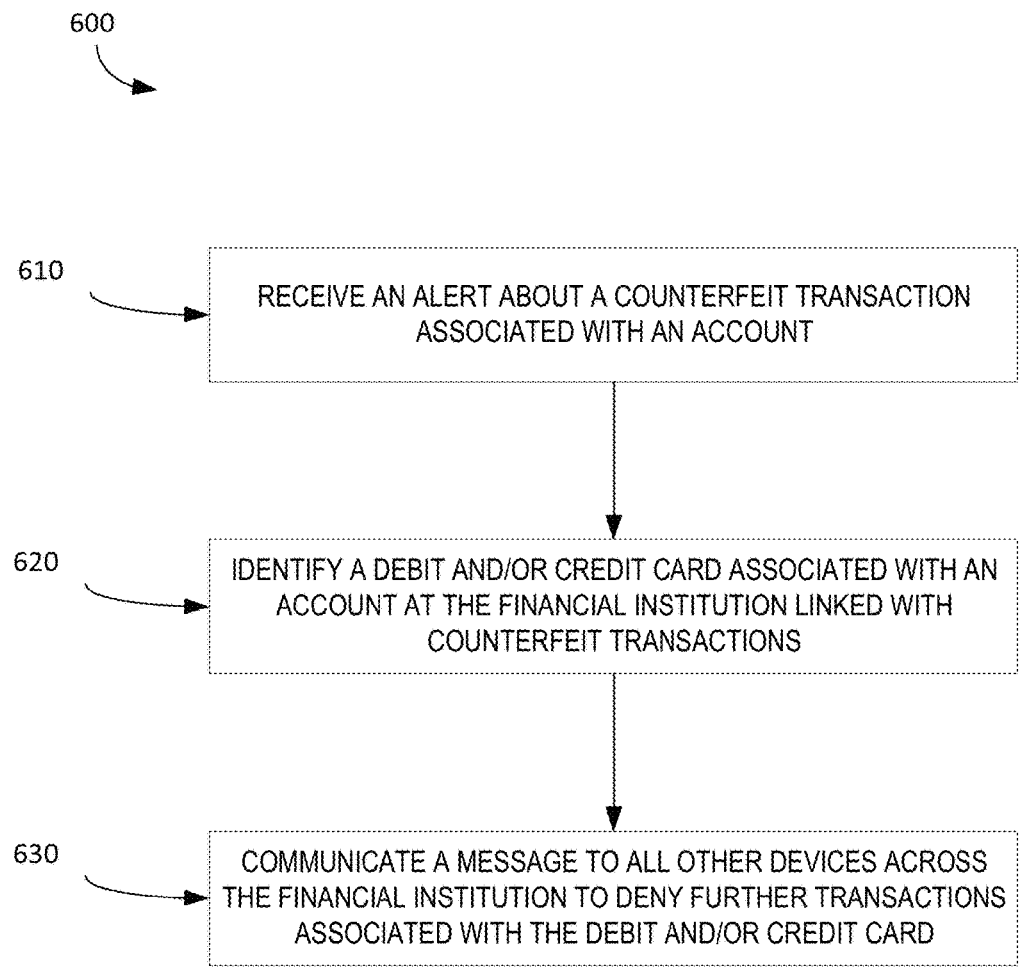
Figure 7:
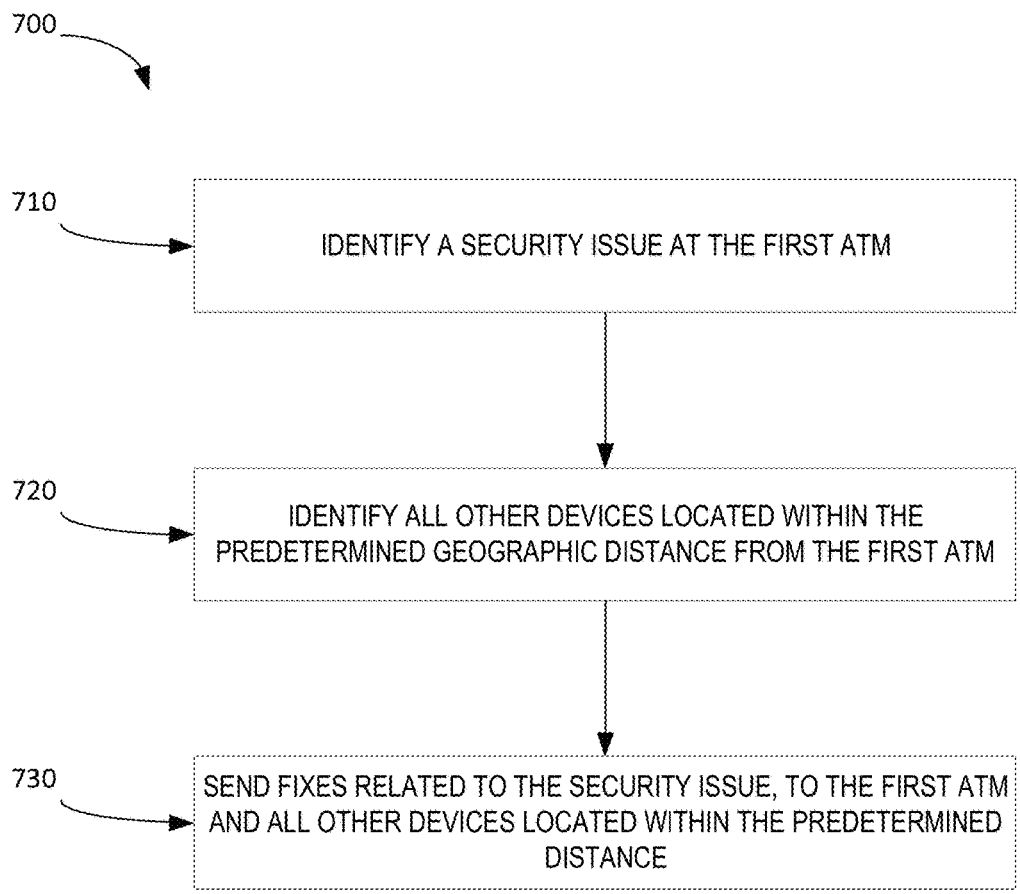
Figure 8A:
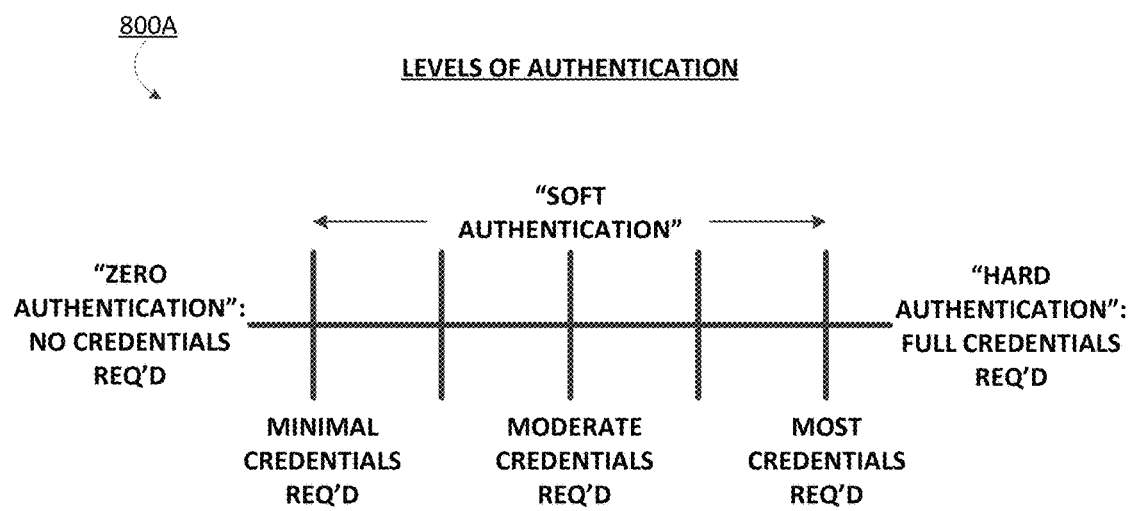
Figure 8B:
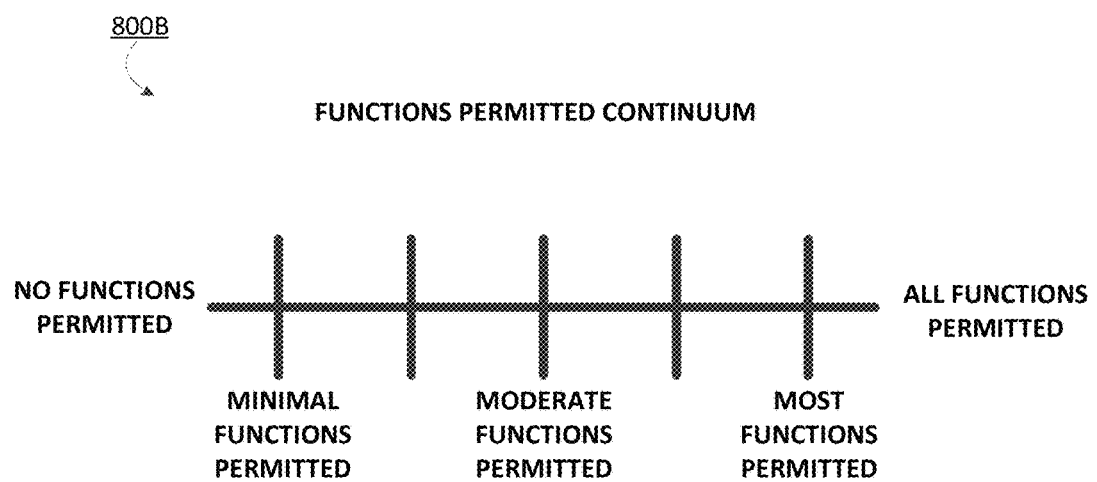
Figure 8C:
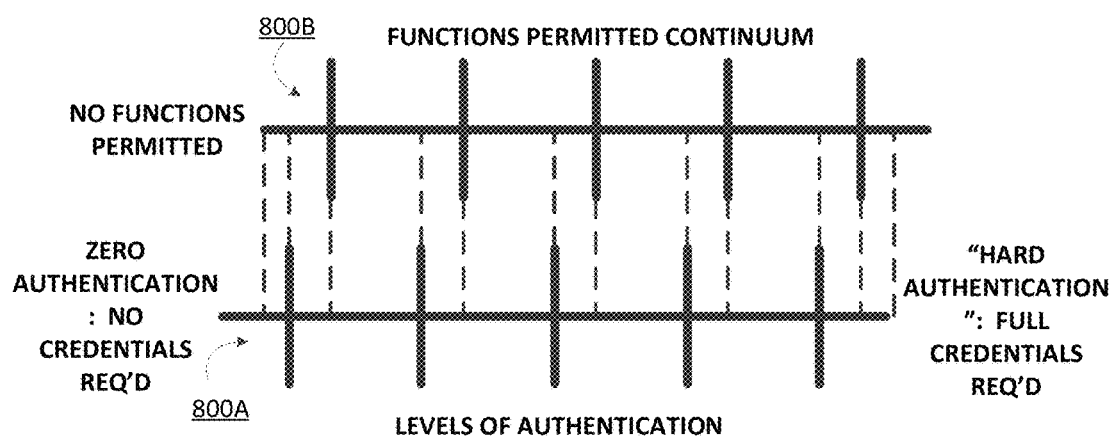

Having thus described some embodiments of the present invention in general terms, reference will now be made to the accompanying drawings, where:

FIG. 1 presents a block diagram illustrating a resource manager entity device security and maintenance system in accordance with embodiments of the invention;

FIG. 2 provides a block diagram illustrating the financial institution system(s) of FIG. 1, in accordance with embodiments of the invention;

FIG. 3 provides a block diagram illustrating the first user's mobile computing device of FIG. 1, in accordance with embodiments of the invention;

FIG. 4 provides a block diagram illustrating the first user's personal computing device of FIG. 1, in accordance with embodiments of the invention;

FIG. 5 illustrates a process flow for notifying the customers and all other ATM's about an issue with a first ATM, in accordance with one embodiment of the present invention;

FIG. 6 illustrates a process flow for notifying all ATM's of the financial institutions to deny future transactions from an account associated with counterfeit transactions, in accordance with one embodiment of the present invention;

FIG. 7 illustrates a process flow for sending fixes related to a security issue, in accordance with one embodiment of the present invention;

FIG. 8A provides a diagram illustrating an authentication continuum, in accordance with an embodiment of the present invention;

FIG. 8B provides a diagram illustrating an application functions permitted continuum, in accordance with an embodiment of the present invention; and FIG. 8C provides a diagram illustrating multiple continuums, in accordance with an embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In accordance with embodiments of the invention, the terms "financial institution" or "financial entity" include any organization that processes financial transactions including, but not limited to, banks, credit unions, savings and loan associations, investment companies, stock brokerages, asset management firms, insurance companies and the like. Furthermore, embodiments of the present invention use the term "user" or "customer." It will be appreciated by someone with ordinary skill in the art that the user or customer may be a customer of the financial institution providing the ATM, a customer of the financial institution providing the resource manager entity device security and maintenance system, not a customer of the financial institution providing the ATM, not a customer of the financial institution providing the resource manager entity device security and maintenance system, or any combination thereof.

In accordance with embodiments of the invention, an "account" is the relationship that a customer has with an entity, such as a financial institution. Examples of accounts include a deposit account, such as a transactional account (e.g., a banking account), a savings account, an investment account, a money market account, a time deposit, a demand deposit, a pre-paid account, a credit account, a debit/deposit account, a non-monetary user profile that includes information associated with the user, or the like. The account is associated with and/or maintained by the entity. The term "resource" or "funds" includes forms of currency or payment stored by a financial institution in an account.

A "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users. An "entity" may be a financial institution, a third party provider, and the like. A "resource" may be any device that is operated by a financial institution or a third party provider and it may be an Automated Teller Machine, a POS device, and the like.

Embodiments of the present invention provide a system and a method for identifying an issue with a resource such as an Automated Teller Machine (ATM) and notifying all other devices across the financial institution of the issue. The other devices are notified of an increase in the number of transactions. In the present invention, a first user accesses online banking portal by using a web browser application or a mobile banking application on a computing device or a mobile device and the system identifies the active online session and notifies the first user of the issue at the ATM. The customer is notified of the issue at the ATM based on the ATM being the customer's preferred ATM. In some embodiments, the system identifies the active online session and notifies the user of the issue based on the location of the customer. The customer's location is determined using the Global Positioning System (GPS). In this way, the customers are directed to the nearby ATM's for future transactions. In some embodiments, the system identifies a security issue associated with the ATM and sends fixes related to the security issue to all devices across the financial institution.

In some embodiments the system detects a counterfeit transaction associated with a debit and/or credit card and identifies the account linked with the debit and/or credit card. All devices across the financial institution are notified of the counterfeit transaction and further transactions linked with the debit and/or credit card associated with the counterfeit transaction are denied.

FIG. 1 presents an exemplary block diagram of the system environment 100 for implementing the process flows described herein in accordance with embodiments of the present invention. As illustrated, the system environment 100 includes a plurality of users (user 1 105, user 2 301, user 3 115), a plurality of Automated Teller Machines (120, 122, 124, 126), a plurality of financial institution servers (200 and 250), and a network 150. A user of the system may be an individual account holder, an agent of the account holder, a customer of a financial institution, or any other entity capable of maintaining a financial account.

The environment 100 includes a plurality of user devices. The user devices may comprise any machine, apparatus, system or the like that may be connected to and communicate with other devices over network 150. At least one of the devices may comprise a mobile device 400 for use by the user 105. The mobile device 400 may be any portable device that employs a processor and memory and can perform computing functions, and that may be connected to or access network 150. As used herein, the mobile device 400 may comprise any mobile communication device, such as a cellular telecommunications device (i.e., a cell phone or mobile phone), personal digital assistant (PDA), a mobile Internet accessing device, or other mobile device. The mobile device 400 may be connected to a network by wireless access such as wireless local area network (WLAN) such as Wi-Fi based on the Institute of Electrical and Electronics Engineers' (IEEE) 802.11 standards, Bluetooth short-wavelength UHF radio waves in the ISM band from 2.4 to 2.485 GHz or other wireless access technology.

The computing device 300 of the user may be any device that employs a processor and memory and can perform computing functions, such as a personal computer. The mobile device 400 or the user device of the user can be any device that employs a processor and memory and may refer to mobile phones, personal computing devices, tablet computers, wearable devices, and/or any portable electronic device capable of receiving and/or storing data therein.

The computing devices 300, 301, and 302 and mobile devices 400, 401, and 402 of different users are configured to communicate over a network 150 with a financial institution banking system servers 200 and 250. The computing device, mobile device, and financial institution banking system server are described at a greater detail below with reference to FIGS. 2-4. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet.

In general, the computing device 300 is configured to connect with the network 150 to allow user 1 to access his/her online banking account with the financial institution's banking system 200. The computing device 150 is also configured to connect with network 150 allow the user to access the third party system such as an online domain. The banking system 200 involves authentication of a user in order to access the user's account in the banking system 200. For example, the banking system 200 is a system where a user 105 logs into his/her account such that the user or other entity can access data that is associated with the user. For example, in one embodiment of the invention, the banking system 200 is an online banking system maintained by a financial institution. In such an embodiment, the user 105 can use the computing device 300 or mobile device 400 to log into the banking system 200 to access user's online banking account. Logging into the banking system 200 generally requires user 105 authenticate his/her identity using a user name, a passcode, a cookie, a biometric identifier, a private key, a token, and/or another authentication mechanism that is provided by the user 105 to the banking system 200 via the computing device 105 or mobile device 400. In some embodiments the authentication system may be a tiered system that may require different levels of authentication based on conditions such as, for example, previous activity of the user over the network 150. For example, the tiered authentication system may have three levels of authentication—hard, medium and soft. Hard authentication may require that the user input a high level of authentication information such as a combination of password, user identification, answer to challenge questions, biometrics, random key number or the like. A hard authentication may be required when the user logs on from an unrecognized user device or where the user activity is not recognized by the system. A medium authentication level may require only a user identification and password. A medium level of authentication may be required where, for example, the user has already logged-in to the mobile device 400 or computing device 300 using an authentication procedure for the device such as a thumbprint or password. A soft authentication may require only a user identification such as user name. A soft level of authentication may be used, for example, where the user has already logged-in to the mobile device 400 or computing device 300 using an authentication procedure for the device such as a thumbprint or password and the user has performed activities on the user device that are recognized as "normal" activity for that user and/or the user device is in a recognized location for that user. Thus, the level of authentication required for accessing the banking application, whether online, mobile or in person, may be adjusted based on conditions, activity, functions or information received about or from the user.

The financial institution's banking system server 200 is in network communication with other devices, such as other financial institution banking system 250, Automated Teller machines across the financial institution. For example, if an ATM is having an issue, a notification is generated by the ATM and is communicated to the financial institution banking system server 200. The Automated Teller Machines 120, 122, 124, and 126 are configured to connect with the network 150 to communicate with one or more financial institutions to provide access to various financial transactions. In some embodiments the financial institution may have several ATM's which communicate with each other over the network 150. It will be understood that, in some embodiments the apparatus, the Automated Teller Machine, and/or the account are maintained by the same financial institution. For example, the ATM 1 is maintained by the same financial institution that holds the customer's account and the customer is notified of the issue at ATM 1 when the system detects an active online session. In other embodiments, the apparatus, the Automated Teller Machine, and/or the account are not maintained by the same financial institution. For example, the financial institution that holds the customer account has an agreement with another financial institution, the system detects an issue at ATM 1 which is not maintained by the same financial institution that holds the customer's account and notifies the customer based on the transaction history of the customer at ATM 1.

FIG. 2 provides a block diagram illustrating the financial institution banking system(s) 200, in greater detail, in accordance with embodiments of the invention. As illustrated in FIG. 2, in one embodiment of the invention, the financial institution system(s) 200 include one or more processing devices 220 operatively coupled to a network communication interface 210 and a memory device 230. In certain embodiments, the financial institution system(s) 200 are operated by a first entity, such as a financial institution, while in other embodiments, the financial institution system(s) 200 are operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the financial institution system(s) 200 described herein. For example, in one embodiment of the financial institution system(s) 200, the memory device 230 includes, but is not limited to, a network server application 270, an authentication application 260, a customer account data repository 280 which includes customer authentication data 280 and customer account information 284, a mobile banking application 290 which includes a mobile web server application 292, a downloadable transaction application 294 and other computer-executable instructions or other data. The computer-executable program code of the network server application 270, the authentication application 260, or the mobile banking application 290 may instruct the processing device 220 to perform certain logic, data-processing, and data-storing functions of the financial institution system(s) 200 described herein, as well as communication functions of the financial institution system(s) 200.

In one embodiment, the customer account data repository 280 includes customer authentication data 282 and customer account information 284. The network server application 270, the authentication application 260, and the mobile banking application 290 are configured to invoke or use the customer account information 284, and the customer authentication data 282, when authenticating a user to the financial institution system(s) 200.

As used herein, a "communication interface" generally includes a modem, server, transceiver, and/or other device for communicating with other devices on a network, and/or a user interface for communicating with one or more customers. Referring again to FIG. 2, the network communication interface 210 is a communication interface having one or more communication devices configured to communicate with one or more other devices on the network 150, such as the mobile device 400, the personal computing device 300, and the other financial institution banking systems 250. The processing device 220 is configured to use the network communication interface 210 to transmit and/or receive data and/or commands to and/or from the other devices connected to the network 150.

Referring now to FIG. 3, the personal computing device 300 associated with user 1 105 also includes various features, such as a network communication interface 310, a processing device 320, a user interface 330, and a memory device 340. The network communication interface 310 includes a device that allows the personal computing device 300 to communicate over the network 150 (shown in FIG. 1). In one embodiment of the invention, a network browsing application 345 provides for a user to establish network communication with a financial institution system(s) 200 (shown in FIG. 1) for the purpose of initiating enrollment in the transaction program, interacting with a device transaction interface, inputting data indicative of actions associated with one or more smart contracts and/or managing transactions, in accordance with embodiments of the invention.

As used herein, "transaction information" may include both monetary and non-monetary transaction information and records. Non-monetary transaction information or records means historical transaction information such as account balances, account activity, misappropriation activity, purchase activity, payment activity and the like and is distinguished from the underlying monetary transactions such as settling of accounts, payments, debits, credits, fund transfers and the like.

As used herein, a "processing device," such as the processing device 320, generally refers to a device or combination of devices having circuitry used for implementing the communication and/or logic functions of a particular system. For example, a processing device 320 may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 320 may further include functionality to operate one or more software programs based on computer-executable program code thereof, which may be stored in a memory. As the phrase is used herein, a processing device 320 may be "configured to" perform a certain function in a variety of ways, including, for example, by having one or more general-purpose circuits perform the function by executing particular computer-executable program code embodied in computer-readable medium, and/or by having one or more application-specific circuits perform the function.

The processing device 320 is configured to use the network communication interface 310 to communicate with one or more other devices on the network 150. The processing may interact with the processing devices of other devices on the network 150. The processing device 320 may control or give instructions to other devices on the network.

As used herein, a "user interface" 330 generally includes a plurality of interface devices and/or software that allow a customer to input commands and data to direct the processing device to execute instructions. For example, the user interface 330 presented in FIG. 3 may include a graphical user interface (GUI) or an interface to input computer-executable instructions that direct the processing device 320 to carry out specific functions. The user interface 330 employs certain input and output devices to input data received from the first user 105 or second user 110 or output data to the first user 105 or second user 110. These input and output devices may include a display, mouse, keyboard, button, touchpad, touch screen, microphone, speaker, LED, light, joystick, switch, buzzer, bell, and/or other customer input/output device for communicating with one or more customers.

As used herein, a "memory device" 340 generally refers to a device or combination of devices that store one or more forms of computer-readable media for storing data and/or computer-executable program code/instructions. Computer-readable media is defined in greater detail below. For example, in one embodiment, the memory device 340 includes any computer memory that provides an actual or virtual space to temporarily or permanently store data and/or commands provided to the processing device 320 when it carries out its functions described herein. In some embodiments, resource data, merchant profile data, customer account data and the like may be stored in a non-volatile memory distinct from instructions for executing one or more process steps discussed herein that may be stored in a volatile memory such as a memory directly connected or directly in communication with a processing device executing the instructions. In this regard, some or all the process steps carried out by the processing device may be executed in near-real-time, thereby increasing the efficiency by which the processing device may execute the instructions as compared to a situation where one or more of the instructions are stored and executed from a non-volatile memory, which may require greater access time than a directly connected volatile memory source. In some embodiments, one or more of the instructions are stored in a non-volatile memory and are accessed and temporarily stored (i.e., buffered) in a volatile memory directly connected with the processing device where they are executed by the processing device. Thus, in various embodiments discussed herein, the memory or memory device of a system or device may refer to one or more non-volatile memory devices and/or one or more volatile memory devices.

FIG. 4 provides a block diagram illustrating a user's mobile device 400 of FIG. 1 in more detail, in accordance with embodiments of the invention. In one embodiment of the invention, the mobile device 400 is a mobile telephone. However, it should be understood that a mobile telephone is merely illustrative of one type of mobile device 400 that may benefit from, employ, or otherwise be involved with embodiments of the present invention and, therefore, should not be taken to limit the scope of embodiments of the present invention. Other types of mobile devices 400 may include portable digital assistants (PDAs), pagers, mobile televisions, gaming devices, laptop computers, cameras, video recorders, audio/video player, radio, GPS devices, or any combination of the aforementioned.

Some embodiments of the mobile device 400 include a processor 410 communicably coupled to such devices as a memory 420, user output devices 436, user input devices 440, a network interface 460, a power source 415, a clock or other timer 450, a camera 470, and a positioning system device 475. The processor 410, and other processors described herein, generally include circuitry for implementing communication and/or logic functions of the mobile device 400. For example, the processor 410 may include a digital signal processor device, a microprocessor device, and various analog to digital converters, digital to analog converters, and/or other support circuits. Control and signal processing functions of the mobile device 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 424. The web browser application 424 may then allow the mobile device 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 260 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless telephone network 152. In this regard, the mobile device 400 may be configured to operate with one or more air interface standards, communication protocols, modulation types, and access types. By way of illustration, the mobile device 400 may be configured to operate in accordance with any of a number of first, second, third, and/or fourth-generation communication protocols and/or the like. For example, the mobile device 400 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 3GPP protocols and/or the like. The mobile device 200 may also be configured to operate in accordance with non-cellular communication mechanisms, such as via a wireless local area network (WLAN) or other communication/data networks.

As described above, the mobile device 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410. The user input devices 440, which allow the mobile device 400 to receive data from a user such as the first user 105, may include any of a number of devices allowing the mobile device 400 to receive data from a user, such as a keypad, keyboard, touch-screen, touchpad, microphone, mouse, joystick, other pointer device, button, soft key, and/or other input device(s). The user interface may also include a camera 470, such as a digital camera.

The mobile device 400 may also include a positioning system device 475 that is configured to be used by a positioning system to determine a location of the mobile device 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate location of the mobile device 400. In other embodiments, the positioning system device 475 includes a proximity sensor or transmitter, such as an RFID tag, that can sense or be sensed by devices known to be located proximate a merchant or other location to determine that the mobile device 400 is located proximate these known devices. Such information may be used by embodiments of the invention in order to demonstrate completion or partial completion of one or more activities associated with a smart contract.

The mobile device 420 further includes a power source 415, such as a battery, for powering various circuits and other devices that are used to operate the mobile device 400. Embodiments of the mobile device 400 may also include a clock or other timer 450 configured to determine and, in some cases, communicate actual or relative time to the processor 410 or one or more other devices.

The mobile device 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the mobile device 400 and/or one or more of the process/method steps described herein. For example, the memory 420 may include such applications as a mobile banking application 422, a conventional web browser application 424, Email application 426 and/or a SMS application 221. These applications also typically provide a graphical user interface (GUI) on the display 430 that allows the first user 105 to communicate with the mobile device 400, the financial institution system(s) 200, and/or other devices or systems. In other embodiments of the invention, the first user 105 interacts with the financial institution system(s) 200 via the web browser application 424 and/or mobile banking application 422.

The memory 420 can also store any of a number of pieces of information, and data, used by the mobile device 400 and the applications and devices that make up the mobile device 400 or are in communication with the mobile device 400 to implement the functions of the mobile device 400 and/or the other systems described herein. For example, the memory 420 may include such data as user authentication information, etc.

FIG. 5 illustrates a process flow for notifying the customers of an issue with an Automated Teller Machine. As shown in block 510, the process flow identifies an issue associated with an ATM. The issue may be defined as the traffic load at the ATM, ATM being low on funds, inability to dispense cash, malfunction, detection of a skimmer, network issue, and the like. In some embodiments identifying an issue is performed by an ATM itself. For example, certain standards are set for an ATM to be functioning properly and any malfunction may trigger an alert which is communicated to the financial institution banking server over the network. In some embodiments, identifying an issue is performed by the financial institution banking system server. For example, the financial institution performs maintenance and performance test for every few minutes or hours and the financial system identifies an issue and notifies all other devices and customers of the issue.

In some embodiments, the system predicts the traffic load at the first ATM by analyzing the transaction data of first ATM and predicts a particular pattern to determine highest volume of transactions on a particular day and/or time and determines the ATM has an issue if the predicted volume of transactions is more than a predetermined limit. For example, if the time taken by the first ATM with high traffic load to initiate a transaction after the customer reaches the first ATM location is greater than the time taken to complete a transaction at another ATM with low traffic load located within a predetermined distance from the first ATM, is recognized as an issue with the first ATM. The system analyzes the previous transaction data at the first ATM and predicts that the load at the first ATM will be higher during a particular time of the day and notifies the customer that the first ATM has an issue.

Next, as shown in block 520, the system after identifying an issue notifies all other ATM's of the issue with the first ATM. Next as shown in block 530, the system transmits an alert of an increase in the number of transactions to all other ATM's across the financial institution. In some embodiments, the ATM communicates a notification of an increase in the number of transactions to all other ATM's over the network. In some other embodiments, the financial institution server communicates a notification of an increase in the number of transactions with all other ATM's. In some embodiments, the financial institution banking system server identifies all ATM's within a predetermined distance from the ATM having an issue and sends out a notification only to those ATM's. In some embodiments, the system after determining an issue at the first ATM causes all other ATM's across the financial institution to run a resource check after receiving a notification that the first ATM has an issue. For example, a second ATM receives a notification from the system about the issue with the first ATM and the system causes the ATM to run a resource check which includes checking if the second ATM has its own resources (number of bills, receipt paper and the like) to support the incoming transactions. The resource check generates an alert based on determining that the second ATM is low on resources and the financial institution server receives the alert over the network. In some embodiments, the alert causes the financial institution server to schedule a maintenance call. In some embodiments, the alert causes the financial institution server to redirect the customers to another ATM. For example, the financial institution receives an alert about low resources on the second ATM and redirects the customers to a third ATM located within a predetermined distance from the first ATM.

In block 540, the system identifies an active online banking session initiated by the user. In some embodiments, the customer accesses his/her online banking account via a mobile phone using a web browser application or a mobile banking application. The customer accesses the online banking account by providing authentication credentials in the web browser application or mobile banking application. The credentials are received over the network, by the financial institution banking system server to validate the user based on the authentication details stored in the database of the server. In some embodiments, the user accesses his/her online banking account via a computing device using a web browser application.

In block 550, the system detects an active online session and causes the graphical user interface to display a message that the first ATM is experiencing an issue and provide locations of all other devices located within a predetermined geographic distance. In some embodiments, the system after detecting an active online session, determines if the customer's preferred ATM has an issue and notifies the customer. In some embodiments, the system detects an online banking session's location and checks for ATM's having an issue located within a predetermined geographic distance and notifies the customer. For example, if the customer accesses the online banking account using the mobile banking application, the system detects the location of the mobile device and then checks for ATM'S having an issue, located within a predetermined geographic distance from the location of the mobile device. If the customer accesses the online banking account using a web browser application in a computing device, the system detects the location of the online banking session by recognizing the location of the wireless network. The system then checks for ATM's having an issue, located within a predetermined distance from the location of the online banking session and notifies the customer. In some embodiments, the predetermined geographic distance is set by the customer of the financial institution. The system also allows the customer to configure and customize the notifications. For example, the system allows the customer to choose the type of alerts or notifications he/she would like to receive. Some customers may limit the type of alerts only to certain type of issues (like detection of skimmer and/or the like). In some embodiments, the predetermined geographic distance is set by the financial institution banking system server.

In some embodiments, the customer may want a list of ATM's that can support his requirements before going to the ATM location. The system processes the customer's requirements inputted by the customer into the graphical user interface of an online banking session and populates a list of ATM's available to the customer. For example, the customer may want to withdraw $2000 cash in $100 bills and at an ATM within 2 miles from his current location. The system populates all ATM's that do not have any issues and also have 20 $100 bills within 2 miles from the location of the customer. In some embodiments, the customer may not have access to ATM's maintained by the same financial institution that maintains his account, the system then populates a list of ATM's on the map maintained by other financial institutions or third party providers which support the debit/credit card of the customer. In some embodiments, after the customer inputs his requirements into the user interface of the web browser provided by the mobile phone or the computing device, the system changes the graphical user interface and displays a map showing different ATM's that are available with the help of indicators. For example, the first ATM has a security related issue, the ATM is marked with yellow color on the map and if a second ATM is running low on funds another color indicator may be used to indicate that the second ATM is low on funds and all the available ATM's may be marked green to show the availability. The indicators used to identify different issues may vary.

In some embodiments, the system may also notify the customers of any natural disasters and may redirect the customer to another available ATM which has not been affected by the natural disaster. For example, customers may want to withdraw cash after receiving a natural disaster warning and the customer may go to an ATM which is currently being affected by the natural disaster. The system warns the customer that the ATM is being affected and redirects the customer to an available ATM which is not currently affected by the natural disaster.

FIG. 6 illustrates a process flow for detecting a counterfeit transaction and communicating a notification to all other ATM's to deny further transactions associated with the account. In some embodiments, the customer identifies a counterfeit transaction posted to his/her account and notifies the financial institution of the transaction at fault. In block 620, the system identifies the debit/credit card linked with the counterfeit transaction. Next as shown in block 630, the system communicates a notification to all ATM's to deny further transactions associated with the identified debit/credit card. In some embodiments, the financial institution server identifies a counterfeit transaction based on the other counterfeit transactions notified by other customers of the financial institution. For example, a first user reports a transaction as a counterfeit, the system identifies the merchant linked with the counterfeit transaction and monitors all transactions associated with the merchant. The system also notifies the customer of the posted charges to the customer's account from the merchant associated with the counterfeit transactions. In some embodiments, the system sends a notification in the form of a text message, email and/or notification to the customer's online banking account.

FIG. 7 illustrates a process flow for identifying a security issue at the first ATM and sending fixes to the security issue. In block 710, the system identifies an issue with the first ATM by performing standard tests from time to time. In some embodiments, the system identifies issues related to security, communication and/or network by running different type of performance tests. In some embodiments, the ATM detects an issue related to security, communication and/or network and communicates a notification to the financial institution server. Next as shown in block 720, the system identifies all other ATM's located within a predetermined distance from the first ATM that may be affected by the same issue. In block 730, the system, sends fixes related to the issue to the first ATM and all other ATM's located within a predetermined distance from the first ATM.

User authentication may be required in a variety of situations such as when a customer enters a resource location and wishes to perform one or more transactions. For example, a user may be required to authenticate identity for access to an application on a computer system or a mobile device or for access to a particular feature, function or action of an application. Numerous types and levels of user authentication exist. For example, a user may authenticate his or her identity using a unique alias such as a username and/or password. Further, in some situations, challenge questions, familiar pictures and/or phrases, biometrics, key fob-based alphanumeric codes and/or collocation, authentication of another application such as a similar application or an "overarching" application, and/or the like may be used as types of identity authentication.

The different types of authentication may provide differing degrees of confidence regarding the authentication using such types. For example, if a username by itself is used for a first user authentication, and a username along with a password is used for a second authentication, then the second authentication should provide a higher confidence regarding the authentication because of the additional layer of authentication required. Further, within the types of authentication, varying levels of confidence may be used. For example, when using a password, an administrator may require users to create a password according to strict rules designed to increase the security level of the password, and therefore increase the confidence of any authentication using the password.

Accordingly, a continuum of authentication may be used to quantify (or dictate) the levels of authentication. Likewise, a continuum of functions permitted may be used to quantify (or dictate) the number or context in which functions are permitted.

Referring to FIG. 8A, a continuum of authentication 800A is illustrated according to embodiments of the invention. On the left-hand side of the continuum, a "zero authentication" requires no authentication credentials. On the right-hand side of the continuum, a "hard authentication" requires full authentication credentials. This means that it requires the strictest combination of credentials. In between the two extremes, "a soft authentication" requires minimal credentials, moderate credentials or most credentials for various points along the continuum. The continuum generally represents the number of credentials required and/or the relative strength of the credentials required for that point on the continuum. As discussed below with reference to FIG. 8C, the continuum of authentication 800A may be coupled with an application functions permitted continuum 800B, first illustrated in FIG. 8B.

Referring to FIG. 8B, the functions permitted continuum 800B illustrates various levels of functions, access, and/or transactions permitted. Functions may refer to what a user is permitted to "see" and/or what the user is permitted to "do". More specifically, this may refer to whether a specific function is permitted at a certain point on the continuum and/or the context in which a certain function is permitted. The left-hand side of the continuum indicates that no functions are permitted, and the right-hand side of the continuum indicates that all functions are permitted. In between the extremes, minimal functions are permitted, moderate functions are permitted and most functions are permitted. Thus, any given point along the continuum 800B corresponds with a certain amount and/or number of functions that are permitted and/or the context in which certain functions are permitted.

Referring now to FIG. 8C, a diagram 800C illustrates a coupling of the application functions permitted continuum 800B and the levels of authentication continuum 800A. As shown, the continua 800B and 800A may be coupled with one another such that the various points along the continua intersect at specific points of the coupled continuum. For example, one continuum may be moved left or right with respect to the other continuum in order to achieve a different relationship between the functions permitted and the credentials required. Accordingly, for a given coupling, a specific point on continuum 800A provides that a particular function or functions may be permitted given that a specified level of authentication credentials are supplied, as indicated by the corresponding point on continuum 800A. For example, a financial institution and/or a user may arrange the continua 800B and 800A with respect to one another and may adjust the arrangement based on changing desires or goals.

In some embodiments, one or both the continua 800B and 800A may have weighted scales such that, as a point on the continuum is moved, the corresponding functions permitted and/or level of authentication required may change exponentially or otherwise. Furthermore, in various embodiments, other representations of the various functions permitted that correspond with the various levels of authentication may be used by the invention.

In various embodiments of the invention, transaction limits and/or thresholds may be used. For example, transaction limits may be used to determine whether a payment credential has been exposed and/or whether to approve or deny a transaction. If a transaction (e.g., transaction information) fails to meet a limit, the transaction may be denied. Alternatively, if a transaction (e.g., transaction information) meets a limit, then the transaction may be allowed.

While the system has been described as determining whether the transaction meets the limits and thereby determining whether an exposure has occurred, in some embodiments filters for determining exposure may also be responsive to transaction information. For example, exceptions to filters may allow a transaction even if a filter is not met. In an embodiment, the system evaluates the transaction information to determine: (1) does the transaction meet the limits; and (2) if the transaction does not meet the limits, does the transaction qualify for an exception to the limits. If the system determines that a positive response to either query, then transaction may be allowed.

In some embodiments, the exceptions are based at least in part upon the transaction information. For example, the system may determine that a transaction does not meet a category limit because doing so would cause the token to exceed the category limit for the time period. In this example, however, the system also determines that the token is near, e.g., within one week, within three days, within one day, or the like, the expiration date of the token or the current evaluation period for the token and that the token has remaining funds in a different category. Given the short period of time remaining for the expenses to be made, the system may determine that the transaction falls within an exception and allow the transaction. In another example, the system may determine that the user is outside of geographic limits defined by a route. The system, however, determines that the user has conducted a transaction at the merchant frequently in the past and therefore allows the transaction based on the previous number of transactions at the merchant. These examples use multiple types of transaction information, e.g., the date of the transaction, the location of the transaction, the category of the transaction, the amount of the transaction, and the like, to determine if the exceptions apply. In some embodiments, only a single piece of transaction information applies. For example, the system may always permit transactions that are associated with a specific category, for example, emergency expenses. The system may always permit transactions at emergency rooms, doctors' offices, and the like.

In some embodiments, the exceptions are determined by the system and/or the user. For example, the system may provide a list of exceptions based on the user's transaction history. If the user has a favorite coffee shop, the system may allow transactions at the coffee shop up to a certain amount even if the transaction would not meet a limit. The user or an administrator may provide exceptions based on location or other transaction information. For example, the user may input exceptions that allow transactions within a specific region, e.g., a city, that would not be allowed outside of the specific region. The exceptions may be changed at any time by the system or user.

The exceptions may be limited by frequency, amount, percentage of the limit, or the like. For example, a transaction may qualify for an exception but only up to a certain percentage of the funds remaining in a related category. For example, a transaction may qualify for an exception because the expense period for the token is almost expired and there are remaining funds in a first category. The system may permit a transaction in a second category up to some percentage (e.g., 50%) of the funds remaining in the first category.

The transaction-responsive limits are designed to provide flexibility to the system and better serve the user. The transaction-responsive limits may be tailored to the user or generic to the token and/or system. By providing for transaction-responsive limits, the system allows transactions that would otherwise be denied based on binary yes/no limits when the transaction information indicates the appropriateness of the transaction.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as a system (including, for example, an system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other systems. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of system and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing system in order to produce a particular machine, such that the one or more computer-executable program code portions, which execute via the processor of the computer and/or other programmable data processing system, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing system to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing system to cause a series of operational steps to be performed on the computer and/or other programmable system. In some embodiments, this produces a computer-implemented process such that the one or more computer-executable program code portions which execute on the computer and/or other programmable system provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for identifying resource issues and managing a network of resources, the system comprising:
   a network communication interface;
   a memory device storing a resource manager entity device security and maintenance application;
   a processing device operatively coupled to the memory device, wherein the processing device is configured to execute computer-readable program code to:
      run performance and maintenance tests periodically for detecting issues associated with a plurality of resources of an entity;
      identify at least one issue associated with at least a first resource of the plurality of resources;
      transmit a notification associated with the at least one issue to the entity based on an alert triggered by the performance and maintenance tests;
      notify, via the network communication interface, the plurality of resources of the entity of the at least one issue associated with the first resource based on identifying the at least one issue;
      transmit an alert to a set of resources of the plurality of resources within a predetermined geographic distance from the first resource of an increase in a number of transactions;
      identify that a customer has initiated an online banking session via a web browser or a mobile application on a user device and identify a location of the customer; and
      notify the customer, via a graphical user interface on the user device, that the first resource is experiencing the at least one issue and provide locations of the set of resources located within the predetermined geographic distance.

2. The system of claim 1, wherein the processing device is further configured to execute computer-readable program code to:
   receive authentication credentials from the user device of the customer;
   validate the authentication credentials, thereby verifying an identity of the customer; and
   in response to validating the identity of the customer, notify the customer via the graphical user interface that the first resource is experiencing the at least one issue.

3. The system of claim 2, wherein the processing device is further configured to execute computer-readable program code to notify the customer of the at least one issue based on validating the identity of the customer.

4. The system of claim 1, wherein the processing device is further configured to execute computer-readable program code to identify the location of the customer based on identifying a location of the initiation of the online banking session.

5. The system of claim 4, wherein the processing device is configured to execute computer-readable program code to notify the customer of the at least one issue based on determining that the first resource is in the proximity of the location of the customer.

6. The system of claim 1, wherein the processing device is configured to execute computer-readable program code to identify a customer's preferred resource.

7. The system of claim 6, wherein the processing device is configured to execute computer-readable program code to notify the customer that the first resource is experiencing at least one issue based on determining that the first resource is the customer's preferred resource.

8. The system of claim 1, wherein the processing device is further configured to execute computer-readable program code to:
   determine that the at least one issue is a security issue; and
   send fixes related to the security issue, to the first resource and the set of resources located within the predetermined geographic distance.

9. The system of claim 1, wherein the processing device is further configured to execute computer-readable program code to:
   identify a counterfeit transaction at least one resource of the plurality of resources;
   identify an account, linked with the counterfeit transaction; and
   communicate a message to the plurality of resources to deny future transactions associated with the account.

10. A computer program product for identifying resource issues and managing a network of resources, the computer program product comprising at least one non-transitory computer-readable medium having computer-readable program code portions embodied therein, the computer-readable program code portions comprising:
   an executable portion configured for running performance and maintenance tests periodically for detecting issues associated with a plurality of resources of an entity;
   an executable portion configured for identifying at least one issue associated with a first resource of the plurality of resources;
   an executable portion configured for transmitting a notification associated with the at least one issue to the entity based on an alert triggered by the performance and maintenance tests;
   an executable portion configured for notifying, via a network communication interface, the plurality of resources of the entity of the at least one issue associated with the first resource, based on identifying the at least one issue;
   an executable portion configured for transmitting an alert to a set of resources of the plurality of resources within a predetermined geographic distance from the first resource of an increase in a number of transactions;
   an executable portion configured for identifying that a customer has initiated an online banking session via a web browser or a mobile application on a user device and identifying a location of the customer; and
   an executable portion configured for notifying the customer, via a graphical user interface on the user device, that the first resource is experiencing the at least one issue and provide locations of the set of resources located within the predetermined geographic distance.

11. The computer program product of claim 10, wherein the computer-readable program code further comprises executable portions configured for:
   receiving authentication credentials from the user device of the customer;
   validating the authentication credentials, thereby verifying an identity of the customer; and
   in response to validating the identity of the customer, notifying the customer via the graphical user interface that the first resource is experiencing the at least one issue.

12. The computer program product of claim 10, wherein the computer-readable program code further comprises executable portions configured for notifying the customer of the at least one issue based on validating the identity of the customer.

13. The computer program product of claim 10, wherein the computer-readable program code further comprises executable portions configured for identifying the location of the customer based on identifying a location of the initiation of the online banking session.

14. The computer program product of claim 10, wherein the computer-readable program code further comprises executable portions configured for notifying the customer of the at least one issue based on determining that the first resource is in the proximity of the location of the customer.

15. The computer program product of claim 10, wherein the computer-readable program code further comprises executable portions configured for:
  determining that the at least one issue is a security issue; and
  sending fixes related to the security issue, to the first resource and the set of resources located within the predetermined geographic distance.

16. A computerized method for identifying resource issues and managing a network of resources, the method comprising:
  running performance and maintenance tests periodically for detecting issues associated with a plurality of resources of an entity;
  identifying at least one issue associated with at least a first resource of the plurality of resources;
  transmitting a notification associated with the at least one issue to the entity based on an alert triggered by the performance and maintenance tests;
  notifying, via the network communication interface, the plurality of resources of the entity of the at least one issue associated with the first resource, based on identifying the at least one issue;
  transmitting an alert to a set of resources of the plurality of resources within a predetermined geographic distance from the first resource of an increase in a number of transactions;
  identifying that a customer has initiated an online banking session via a web browser or a mobile application on a user device and identifying a location of the customer; and
  notifying the customer, via a graphical user interface on the user device, that the first resource is experiencing the at least one issue and provide locations of the set of resources located within the predetermined geographic distance.

17. The computerized method of claim 16, wherein the method further comprises notifying the customer of the at least one issue based on determining that the first resource is in the proximity of the location of the customer.

18. The computerized method of claim 16, wherein the method further comprises:
  identifying a customer's preferred resource;
  determining that the first resource is a customer's preferred resource; and
  notifying the customer that the first resource is experiencing at least one issue based on determining that the first resource is the customer's preferred resource.

19. The computerized method of claim 16, wherein the method further comprises:
  determining that the at least one issue is a security issue; and
  sending fixes related to the security issue, to the first resource and the set of resources located within the predetermined geographic distance.

20. The computerized method of claim 16, wherein the method further comprises:
  identifying a counterfeit transaction at least one resource of the plurality of resources;
  identifying an account, linked with the counterfeit transaction; and
  communicating a message to the plurality of resources to deny future transactions associated with the account.

* * * * *